United States Patent
Georgi et al.

(10) Patent No.: US 7,412,311 B2
(45) Date of Patent: Aug. 12, 2008

(54) METHOD AND APPARATUS FOR TRANSPORTING A PATIENT SUPPORT

(75) Inventors: Falk Georgi, Saalfeld (DE); Peter Hopfe, Ludwigsstadt (DE); Michael Graef, Jena (DE); Thomas Reichardt, Uhlstädt (DE); Carolin Brand, Rottenbach (DE)

(73) Assignee: Trumpf Medizin Systeme GmbH, Saalfeld (DE)

( * ) Notice: Subject to any disclaimer, the term of this patent is extended or adjusted under 35 U.S.C. 154(b) by 710 days.

(21) Appl. No.: 10/903,481

(22) Filed: Aug. 2, 2004

(65) Prior Publication Data
US 2005/0065675 A1 Mar. 24, 2005

(30) Foreign Application Priority Data
Jul. 31, 2003 (DE) ................. 103 36 303

(51) Int. Cl.
*G06F 19/00* (2006.01)
(52) U.S. Cl. ........................ 701/23; 318/580
(58) Field of Classification Search .............. 701/23, 701/25–28, 200; 600/424
See application file for complete search history.

(56) References Cited

U.S. PATENT DOCUMENTS

| 4,750,197 A | * | 6/1988 | Denekamp et al. | ........ 455/404.2 |
| 6,985,766 B2 | * | 1/2006 | Braun et al. | ................ 600/424 |
| 2001/0044577 A1 | | 11/2001 | Braun et al. | |

FOREIGN PATENT DOCUMENTS

| DE | 38 41 479 | 6/1990 |
| DE | 100 03 269 | 8/2001 |

* cited by examiner

*Primary Examiner*—Yonel Beaulieu
(74) *Attorney, Agent, or Firm*—Fish & Richardson P.C.

(57) ABSTRACT

A transport device for transporting a patient support panel or a medical appliance includes a drive unit, which includes a drive motor, an undercarriage having wheels rotatably mounted on it for driving the undercarriage, and a sensor unit for receiving a signal indicating the position of the transport device with respect to a predetermined path line while the transport device moves along the predetermined path line. One or more of the wheels are rotatably drivable by the drive unit, and one or more wheels are steerable.

31 Claims, 4 Drawing Sheets

METHOD AND APPARATUS FOR TRANSPORTING A PATIENT SUPPORT

CLAIM OF PRIORITY

This application claims priority under 35 USC § 119 to German Patent Application Serial No. 103 36 303.3, filed on Jul. 31, 2003, the entire contents of which are hereby incorporated by reference.

TECHNICAL FIELD

This disclosure relates to a method and apparatus for transporting a patient support panel, in particular, an operating table panel and/or medical appliances.

BACKGROUND

For transporting a patient support panel (e.g., an operating table panel), a trolley is normally used, which often includes a motorized drive unit and at least one steerable wheel, so that the patient support panel can be moved along a desired path line from one location to another. Instead of being in the form of a trolley, the transport device may also be designed as a mobile operating table for transporting a patient.

The transport device can include a drive unit (e.g., an electric motor) for rotatably driving at least one of the wheels, which can simplify transportation of the patient support panel, possibly with a patient lying on the support panel.

Rail-bound transport devices for moving a patient support panel along the path line predetermined by the rails are already known. Transportation, which is substantially jolt-free and therefore handles the patient gently, is thereby ensured, but transportation can only take place along the rails. The use of rails has the further disadvantage that considerable efforts are required for maintaining the entire transport system, including, for example, the transportation device and the floor surface over which it moves, in a hygienically clean state.

SUMMARY

In first general aspect, a method of transporting a medical device includes supporting the medical device on a transport device, moving the transport device along a predetermined path line, wherein the movement of the transport device is not guided by a rail, receiving a signal indicating the position of the transport device with respect to the predetermined path line while the transport device moves along the predetermined path line, and adjusting the direction of the transport device in response to the signal.

Implementations can include one or more of the following features. For example, the medical device can be a patient support panel, an operating table panel, or a medical appliance. The transport device can be moved automatically along the predetermined path line. The method can further include A supplying current through an electrical conductor, detecting a magnetic or electromagnetic field generated by the current flowing through the electrical conductor, and adjusting the direction of the transport device automatically to move the transport device along the electrical conductor.

A speed of the transport device can be controlled to within at least one predetermined allowable speed range. A speed of the transport device can be controlled to within a first predetermined allowable speed range along a first section of the path line and to within a second predetermined allowable speed range along a second section of the path line. The second section of the path line can correspond to an opposite direction from the first section of the path line. An acceleration of the transport device can be controlled to within at least one predetermined allowable accelerating range. An acceleration of the transport device can be controlled to within a first predetermined allowable acceleration range along a first section of the path line and to within a second predetermined allowable acceleration range along a second section of the path line. The second section of the path line can correspond to an opposite direction from the first section of the path line.

In another general aspect, a transport device for transporting a patient support panel or a medical appliance includes a drive unit, which includes a drive motor, an undercarriage having wheels rotatably mounted on it for driving the undercarriage, and a sensor unit for receiving a signal indicating the position of the transport device with respect to a predetermined path line while the transport device moves along the predetermined path line. One or more of the wheels are rotatably drivable by the drive unit, and one or more wheels are steerable.

Implementations can include one or more of the following features. For example, the transport device can form a self-propelled and self-steering operating table. The transport device can be adapted to be steered either in response to a signal from the sensor unit or manually. The transport device can include a drive wheel arranged in a height-adjustable manner on the undercarriage. The transport device can further include a control unit, connected to the drive unit, for controlling movement of the transport device to within at least one predetermined range of speeds. The transport device can further include an operating element, associated with the control unit, for selecting at least one particular range of speeds to be associated with a desired path line.

The transport device can further include a memory, associated with the control unit, for storing path line-dependent predetermined ranges of speeds. The path line-dependent predetermined ranges of speed can be automatically stored in the memory during a learning run of the transport device. The transport device can further include an input element, associated with the control unit, for receiving input of at least one path line-dependent range of speeds. The transport device can further include a control unit, connected to the drive unit, for controlling movement of the transport device to within at least one predetermined range of accelerations. The transport device can further include an operating element, associated with the control unit, for selecting at least one particular range of accelerations to be associated with a desired path line. The transport device can further include a memory, associated with the control unit, for storing path line-dependent predetermined ranges of accelerations. The path line-dependent predetermined ranges of accelerations can be automatically stored in the memory during a learning run of the transport device. The transport device can further include an input element, associated with the control unit, for receiving input of at least one path line-dependent range of accelerations.

The transport device can further include a steering unit coupled to the one or more steerable wheels and interacting with the sensor unit to steer the one or more steerable wheels to control movement of the transport device along the predetermined path line.

The sensor unit of the transport device can be adapted for detecting a path marker disposed on the predetermined path line or for detecting a path marker extending along the predetermined path line. The sensor unit of the transport device can include a light-sensitive sensor, an electronic camera, a magnetic field-sensitive sensor, or a sensor that detects an electromagnetic field.

The transport device can include a comparator for comparing an actual position detected by the sensor unit with a predetermined set position, and a control unit connected to the steering unit, the sensor unit, and the comparator. The control unit can be adapted for supplying a steering signal to the steering unit upon deviation of the actual position from the set position.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

General Methodology

In general, a transport device can be moved in a non-rail-bound and sensor-controlled manner along a predetermined path line. A jolt-free travel of the transport device can be achieved by using one or more sensors to move the transport device in a non-rail-bound manner along a predetermined path line. Consequently, no rails are required for moving the transport device. Therefore, both the transport device and the floor surface forming a travel path can be cleaned in a reliable manner, and high demands with respect to hygiene can also be readily met. Jolt-free travel is ensured through the sensors, which, upon deviation of the direction of travel of the transport device from the predetermined path line, deliver a sensor signal that can be used for correcting the direction of travel. A deviation of the actual position of the transport device from the position specified by the path line can be detected in a contact-free manner by the sensors.

The transport device can be moved automatically in a sensor-controlled manner along a path marker extending along the path line. The path marker extends from the point of departure to the destination of the transport device and can be detected in a contact-free manner by the sensor used. Provision may be made for several path markers to be spaced from one another along the path line. The individual path markers are detected one after the other by the one or more sensors, and a change in the direction of travel can be predetermined for each path marker, so that the transport device travels in a straight line along the distance between two path markers, whereas a predetermined change in the direction of travel is carried out in the area of a path marker detected by the sensor.

For example, when a plurality of spaced path markers are used, the transport device can be controlled by a distance sensor in the area between two path markers. This allows, in a constructionally simple way, a consistent spacing of the transport device from an obstruction (e.g., a wall of a building, in the area between two path markers). To this end, the spacing of the transport device from the obstruction is determined by the distance sensors, and a correction of the direction of travel is carried out if the spacing exceeds or drops below a tolerance value.

The transport device can be automatically moved by a sensor element that is sensitive to a magnetic field or an electromagnetic field along an electric conductor extending along the predetermined path line and having current flowing through it. The conductor with current flowing through it can create a magnetic field along the path line that is detectable by the sensor element sensitive to the magnetic field, so that the transport device can be moved automatically along the magnetic field. The electric conductor with current flowing through it can, for example, be integrated into the floor surface to form a travel path for the transport device. If alternating current flows through the electric conductor, an electromagnetic field is generated by the conductor, which can be detected by the sensor element, for example, by a voltage being induced in the sensor element. For example, the sensor element may be an antenna in the form of a conductor loop.

Path line-dependent speed values and acceleration values can be predetermined for the transport device, such that a certain driving behavior in accordance with the desired path line is ensured, for example, a certain travel speed and/or a certain positive acceleration and braking acceleration behavior. For example, when a patient is lying on the patient support panel a relatively low speed and low positive acceleration and braking acceleration can be specified for the transport device, such that the patient experiences little strain, whereas higher speed and acceleration values can be used during return travel of the transport device without a patient.

The transport device can be steered selectively either in a sensor-controlled manner or manually, such that deviations from the predetermined path line are possible at any time. To deviate from the predetermined path line, the automatic sensor-controlled steering is switched off, so that the operator can steer the transport device manually.

The transport device can be moved by a drive unit, such that only a very low force expenditure is required for transporting the patient support panel, possibly with a patient resting on the support panel.

For automatic movement of the transport device, the transport device can include a steering unit that is coupled to the at least one steerable wheel and that interacts with a sensor unit for detecting the position of the transport device in a contact-free manner. Thus, the position of the transport device with respect to the predetermined path line can be detected in a contact-free manner by the sensor unit. A position-dependent sensor signal can be delivered to the steering unit by the sensor unit, so that the at least one steerable wheel can be steered by the steering unit in dependence upon a deviation of the actual position of the transport device from a set position predetermined by the path line.

A path marker disposed on the path line can be detected by the sensor unit. As explained herein, several path markers can be spaced from one another along the path line, and the sensor unit can detect the path markers in a contact-free manner. A change in the direction of travel can be predetermined for each of the path markers in such a way that the transport device carries out a change in the direction of travel when the sensor unit indicates that a certain path marker is reached. The sensor unit can include distance sensors by through which the spacing of the transport device from an obstruction, for example, a wall, can be detected in the area between two path markers, and a change in the direction of travel can be made if the detected value of the spacing deviates from a predetermined set value.

A path marker extending along the entire path line can be detectable by the sensor unit. The path marker can be, for example, a guiding strip that extends along the entire path line and along which the transport device is automatically movable in a non-rail-bound and sensor-controlled manner.

As explained herein, a contact-free sensor unit can be used to control movement of the transport device. The sensor unit may include, for example, a light-sensitive sensor element, for example, an element that is sensitive to infrared radiation and/or visible light radiation, which can detect an optical guiding band extending along the path line in a contact-free manner. The optical guiding band can include, for example, a transmitter (e.g., a strip-shaped transmitter) that extends along the predetermined path line and that transmits visible light radiation or infrared radiation. The sensor unit can include an electronic camera (e.g., a CCD camera). For example, the camera can detect a color or intensity pattern, such as a bright strip on a dark background extending along the path line.

The sensor unit of the transport device can include a magnetic field-sensitive sensor element, for example, a Hall sensor. As explained herein, such a sensor element enables in a constructionally simple way, movement of the transport device along a magnetic field which extends along the predetermined path line and that can be detected in a contact-free manner by the sensor element. An electric conductor can generate the magnetic field with current flowing through it, which is integrated into a floor surface on which the transport device is movable.

The sensor unit can include a sensor element that detects an electromagnetic field. Thus, the aforementioned electric conductor can be supplied with AC voltage, so that the conductor is AC powered and generates an electromagnetic field that is detectable by the sensor element. The sensor element can be, for example, be configured as an antenna in the form of a conductor loop in which a voltage is induced. The induced induction voltage depends upon the spacing of the sensor element from the conductor, so that the strength of the induction voltage represents a measure of the spacing of the transport device from the path line.

The transport device can include a control unit that is connected to the steering unit and to the sensor unit. The transportation device can also include a comparator element for comparing the actual position detected by the sensor unit with a predetermined set position. In the event of a predetermined deviation of the actual position from the set position, a steering signal can be supplied to the steering unit. As a result of the steering signal supplied, the steering unit can cause a change in the direction of travel of the transport device so as to make the actual position approach the set position.

The control unit can be connected to the drive unit of the transport device. Speed values and/or acceleration values for travel of the transport device along the path line can be predetermined for the control unit, and the drive unit can be controlled by the control unit in dependence upon the predetermined speed values and/or acceleration values. Such a configuration has the advantage that a certain driving behavior, in particular, a certain positive acceleration and braking acceleration behavior, can be predetermined for the transport device so as to ensure jolt-free travel along the desired path line. For example, several path-dependent speed values and/or acceleration values for the control unit can be predetermined to control travel of the transport device along a certain path line, so that in depending upon the path covered, a desired speed and/or a desired acceleration is maintained by the drive unit. This enables, on the one hand, particularly gentle transportation of a patient resting on the patient support panel and, on the other hand, more speedy return transportation of the transport device if no patient is on the patient support panel.

A memory (e.g., a read-only memory) can store path line-dependent speed values and/or acceleration values to be associated with the control unit. Thus, speed values and/or acceleration values associated with a desired path line can be called up from the memory and supplied to the control unit.

The speed values and/or acceleration values can be stored automatically during a learning run of the transport device. Therefore, the transport device can have a "movement memory" so that the speed values and/or acceleration values of the transport device can be acquired and stored during a learning run with manual steering by the operator and can be retrieved for subsequent runs controlled by the control unit.

The respective direction of travel of the transport device during a learning run can be acquired and stored in the memory. Then, during a subsequent sensor-controlled run of the transport device, the stored path-dependent data relating to the direction of travel can be compared with the real-time data relating to the direction of travel during the sensor-controlled run, and any deviations in travel path from the stored travel path can be corrected. With such a configuration, the sensor unit can be a path sensor, and, in addition, the respective direction of travel of the transport device can be detected in a contact-free manner. For example, the alignment of the at least one steerable wheel can be scanned to determine the direction of the transport device. In addition, the path covered by the transport device can be detected with respect to a point of departure from a predetermined path line.

An input element for input of path line-dependent speed values and/or acceleration values can be associated with the control unit. The input element allows programming of the control unit with, for example, speed values and/or acceleration values associated respectively with a certain path line input through an input keyboard or an interface. Several sets of speed values and/or acceleration values can be associated with a certain path line, to allow calling up a special set of speed values and/or acceleration values for a certain path line that can depend upon the respective transport conditions. For example, a first set of speed values and/or acceleration values can be provided for a certain path line for transportation of a patient to an operating theater, while a different set of speed values and/or acceleration values can be provided for the same path line for the run of the transport device without a patient.

An operating element (e.g., a remote control) for selecting speed values and/or acceleration values associated with a desired path line can be associated with the control unit. The operating element can be connected to the control unit of the transport device through a connection cable. Alternatively, the operating element can be communicate wirelessly with the control unit. For example, an infrared transmitter and an associated infrared receiver can be used for wireless communications between the operating element and the control unit.

The transport device can be used for transporting a patient support panel or also for transporting medical appliances. The transport device can form a self-propelled and self-steering operating table. Thus, a patient resting on the patient support panel can be moved from a first location (e.g., an operating theater) to a second location before, during, and/or after an operation in a jolt-free manner and without any exertion on the part of the operator. The second location can include, for example, X-ray apparatus, a CT scanner, a magnetic resonance tomograph, or other equipment for diagnosis.

Subsequently, the patient can be transported either to the operating theater again or to another location by the transport device. Medical appliances for treating the patient can be held on the transport device accommodating the patient support panel. Alternatively, an additional transport device can be used for transporting the medical appliances and moved in a sensor-controlled manner along with the transport device transporting the patient.

As explained herein, the transport device can be selectively steerable either in a sensor-controlled manner or manually. Thus, an operator can move the transport device either automatically in a sensor-controlled manner or can steer the transport device manually. The transport device can be either drivable by a motor or manually movable. Thus, the operator has the possibility of choosing between three operating modes of the transport device, with manual steering and manual drive being used in a first operating mode, motorized driving, but manual steering in a second operating mode, and both automatic steering and automatic drive in a third operating mode, so that the transport device is automatically drivable in a sensor-controlled manner.

For motorized driving, the transport device includes at least one rotatably drivable wheel. This wheel forms a drive wheel and can be held in a height-adjustable manner on the undercarriage. Thus, the drive wheel can be held either in a position spaced from the floor surface or in a position contacting the floor surface. For example, the drive wheel can be deployable to press against the floor surface. If the transport device is to be driven by the motor, the drive wheel is transferred to its position contacting the floor surface, whereas the drive wheel is transferred by a lifting device to its position spaced from the floor surface if the transport device is to be moved without motorized driving.

The transport device can include at least one steerable wheel and at least one rotatably drivable wheel. The rotatably drivable wheel can be constructed so as to be simultaneously steerable and thus to assume both the steering of the transport device and the function of the motorized driving of the transport device.

This general methodology can be implemented in a variety of apparatuses and particular methods.

Exemplary Implementations

FIGS. 1 to 5 show schematically a transport device generally denoted by the reference numeral 10. The transport device includes an undercarriage 12 that forms a substantially U-shaped frame with two longitudinal members 13 and 14 oriented parallel to each other and a transverse member 15. Rotatably mounted at each of the outer corners of the undercarriage 12 is a wheel in the form of a double-jointed roller 16, 17, 18, and 19. The double-jointed rollers 18 and 19 mounted in the area of the transverse member 15 are rigidly connected to each other by a steering rod 21 that is coupled with a steering motor 22 integrated into the undercarriage 12. The double-jointed rollers 16-19 can be held in the usual way on the undercarriage 12 for pivoting movement about a vertical pivot axis, and the double-jointed rollers 18 and 19 can be steered in a coordinated manner by the steering rod 21 and the steering motor 22.

A drive wheel 24 that is rotatably drivable by a drive motor 25 is held in a height-adjustable manner on the underside of the undercarriage 12 in the area between the two longitudinal members 13 and 14. For motorized drive of the transport device 10, the drive wheel can be lowered onto and pressed against a floor surface 27 represented schematically in FIG. 5 by a lifting device 60 (represented only schematically in FIG. 3) whereas for operation of the transport device 10 without motorized drive, the drive wheel 27 can be raised into a position spaced from the floor surface 27.

Figure 2:
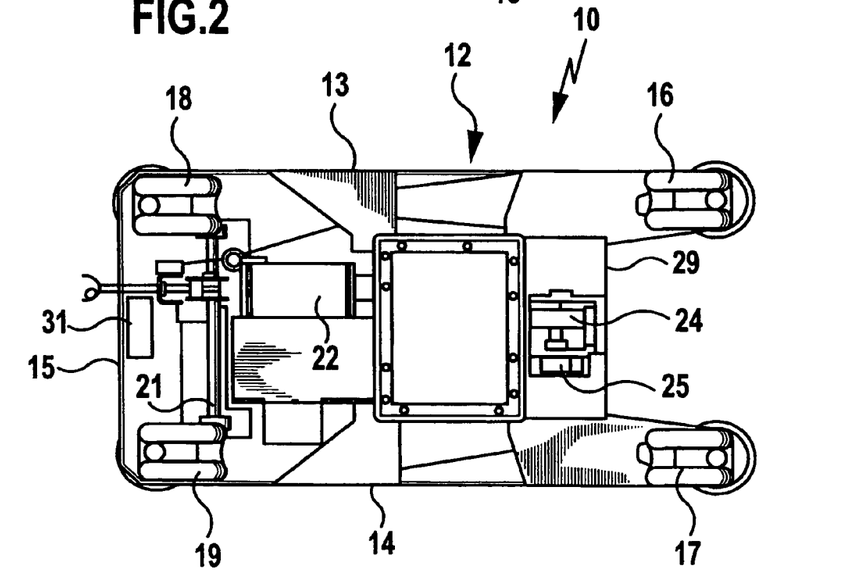
FIG. 2 is a schematic, partially broken open, bottom view of the transport device of to FIG. 1.

Between the two longitudinal members 13 and 14, the undercarriage 12 accommodates a control device 29 that is electrically connected by a sensor line 32 to a sensor unit 31 that is held at the center, and in a transverse direction, on the underside of the transverse member 15, so as to face the floor surface 27.

Figure 1:
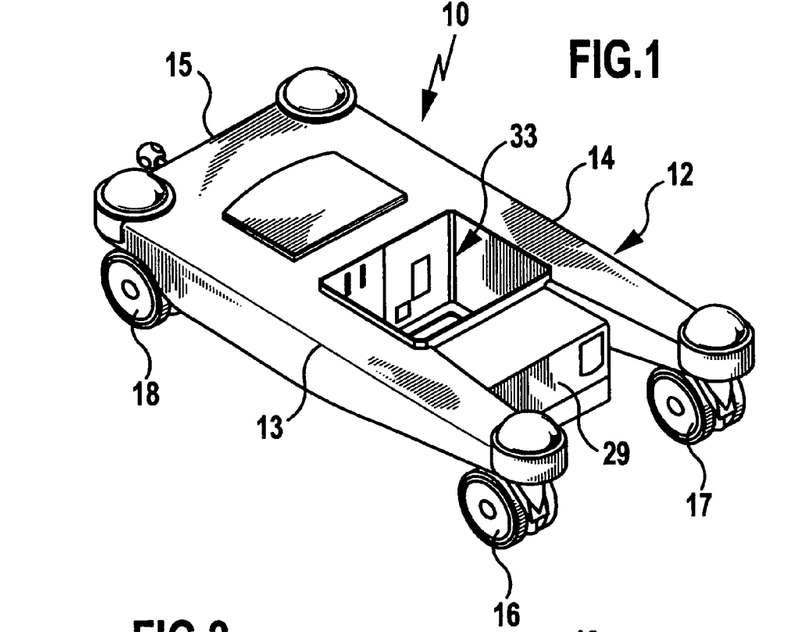
FIG. 1 is a perspective view of a transport device for transporting a patient support panel.

On the upper side, the undercarriage 12 has in the area between the two longitudinal members 13 and 14 a receptacle 33 into which a supporting device for either a patient support panel or table, or a medical appliance can be inserted, so that these can be transported by the transport device 10.

The transport device 10 is of self-propelled and self-steering construction and can be moved in a sensor-controlled manner along a predetermined path line with programmable driving behavior. The path line can be predetermined by path markers that are detected by the sensor unit 31, so that the steering motor 22 can be provided with a steering signal for automatic steering of the double-jointed rollers 18 and 19 along the desired path line.

Figure 3:
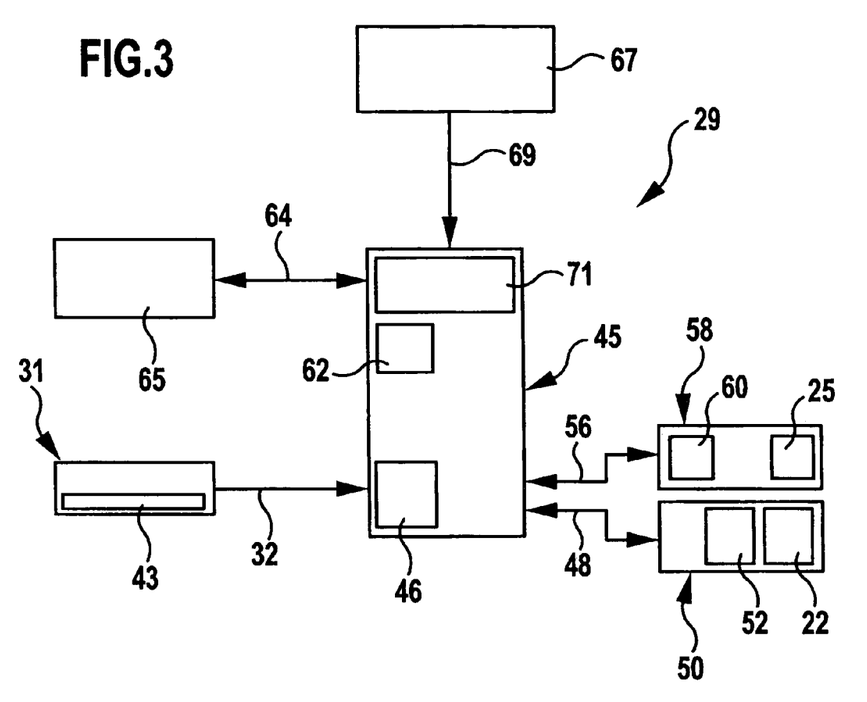
FIG. 3 is a block diagram of control components of the transport device according to FIG. 1.
Figure 4:
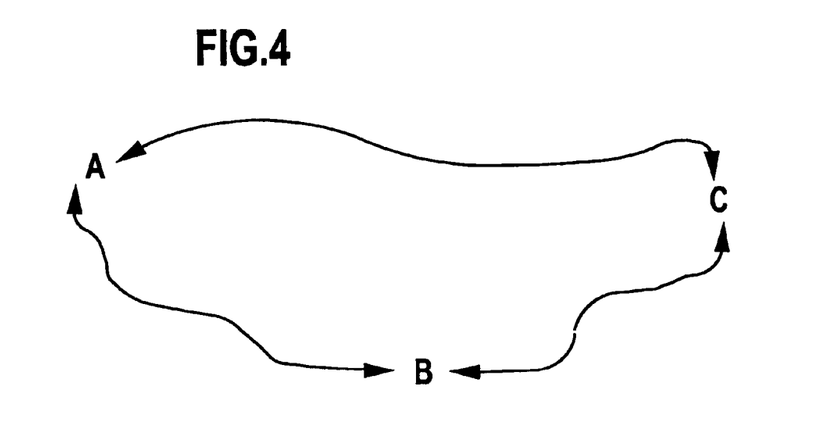
FIG. 4 is a schematic view of different path lines along which the transport device can be moved in a sensor-controlled manner.
Figure 5:
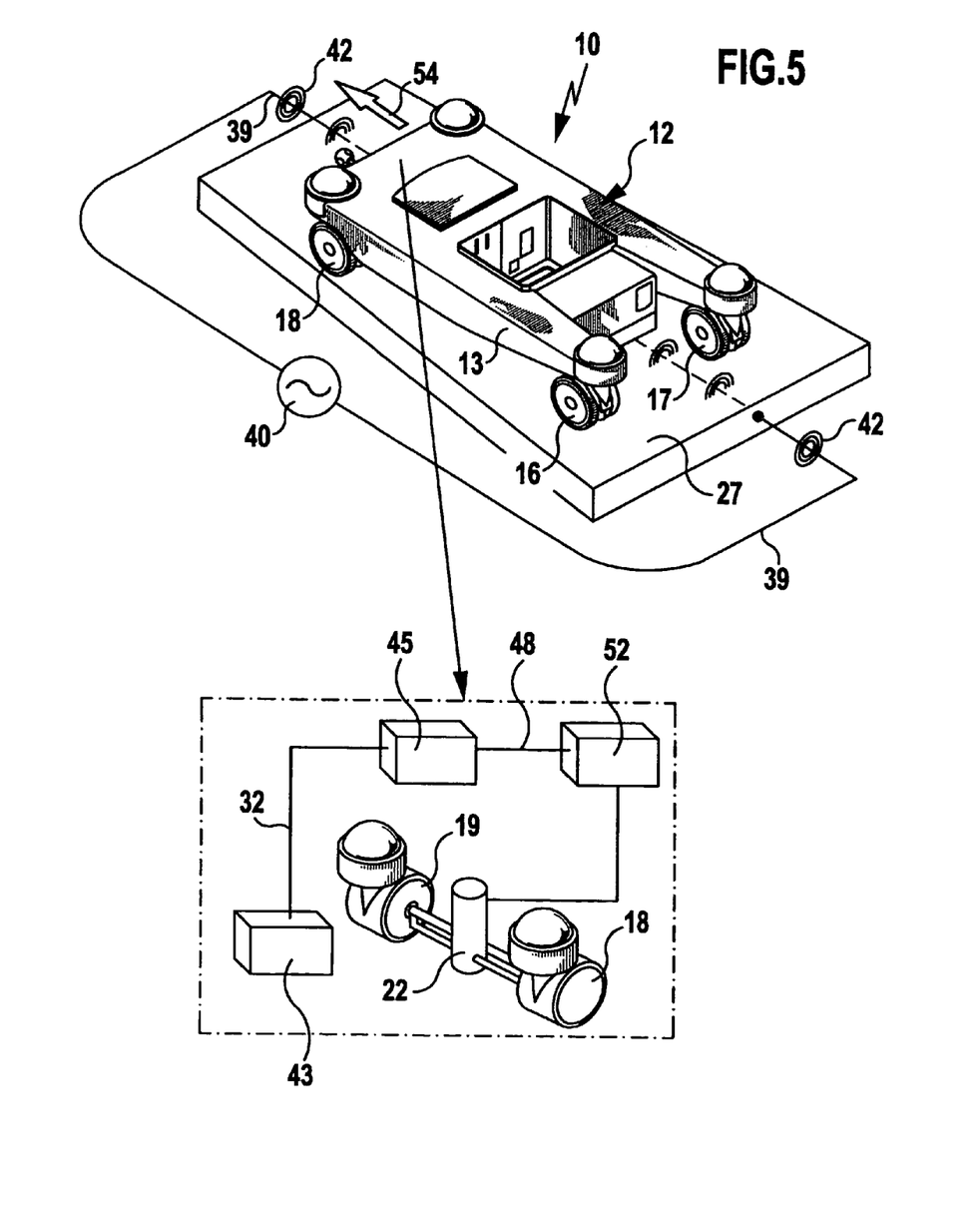
FIG. 5 is a schematic perspective view of the transport device of FIG. 1 as it interacts with a path marker.

A conducting wire 39, as shown in FIG. 5, which is integrated in the floor surface 27 and connected to an electric power supply 40, can be used as a path marker. The power supply 40 can supply the conducting wire 39 with an AC voltage having, for example, a frequency of from approximately 5 kHz to approximately 12 kHz, so that the conducting wire 39 generates an electromagnetic field 42 that extends along the desired path line and that can be detected by a sensor element 43 of the sensor unit 31. The sensor element can be configured in the form of a conductor loop in which an induction voltage is induced due to the alternating electromagnetic field 42. The sensor unit 31 is connected by the sensor line 32 to a control unit 45 of the control device 29, which includes a comparator element 46. A set position in the form of a maximum induction voltage may be predetermined for the comparator element 46 and compared with the voltage induced in the sensor element 43. In the event of deviations of the set position from the actual position relative to the conducting wire 39, a control signal can be supplied by the comparator element 46 and transmitted through a first signal line 48 to a steering unit 50. The steering unit 50 includes a steering amplifier 52 followed by the previously described steering motor 22. Thus, by contact-free detection of the electromagnetic field 42 generated by the conducting wire 39, the direction of travel of the transport device 10 indicated by the arrow 54 in FIG. 5 can be continuously selected by the steering unit 50 such that the transport device 10 automatically follows the electromagnetic field 42.

The control unit 45 is connected by a second signal line 56 to a drive unit 58 including the drive motor 25 described herein and the lifting device 60 for raising and lowering the drive wheel 24. Thus, the driving behavior of the transport device 10 can be specified as it travels along the conducting wire 39. In particular, the travel speed and the positive acceleration and braking acceleration behavior of the transport device 10 can be specified. For this purpose, the control unit 45 includes a memory 62 that is electrically connected by an input line 64 to a programming unit 65. Path line-dependent speed and acceleration values can be input in the memory 62 by the programming unit 65 (i.e., the driving data for a desired driving behavior can be stored in the memory 62 for a desired path line). For travel along a desired path line, these driving data can then be retrieved from the memory 62 and processed to control the drive unit 58.

A remote control unit 67 is associated with the control unit 45 for operating the transport device 10. The remote control unit 67 can be coupled, e.g., through an infrared connection 69 (or other wireless communication device) to a receiving unit 71 of the control unit 45. With the remote control unit 67, a user can operate the transport device 10 in three different operating modes. In a first operating mode, both the drive unit 58 and the steering unit 50 are deactivated, so that the transport device 10 can be moved and steered manually. In a second operating mode, only the drive unit 58, but not the steering unit 50, is activated. This makes it possible for a user to move the transport device 10 with very little force expenditure, and the travel of the transport device 10 is not bound to any specified path line. In a third operating mode, both the drive unit 58 and the steering unit 50 are activated. In the third operating mode, it is possible for the user to either call up the driving data associated with a certain path line in the memory 62 or to input new driving data, for example, new travel speeds and new acceleration values for the pertinent run of the transport device 10, or to select a freely selectable stored set of data that is not bound to a certain path line and that is then evaluated by the control unit 45 for the pertinent run.

A rail-free transportation with gentle positive acceleration and braking acceleration procedures that treats the patient gently can be ensured with the transport device 10. For example a patient may be transported with the transport device 10 from a location A shown in FIG. 4 where, for example, a patient is admitted, along a first path line at a first speed and with first positive and braking acceleration values in a jolt-free and gentle manner to a location B for various diagnoses to be made. Subsequently, the patient can either be transported back to location A, in which case, a different driving behavior may be selected, if desired, or the patient can be transported from location B to a location C, for example, an operating theater, where, again, a different driving behavior can be used. Then, the patient can be returned to location B or transported to location A from location C, and, again, a different driving behavior can be specified. Transportation between locations A, B, and C can be carried out in a jolt-free manner as the transport device 10 aligns itself automatically in a sensor-controlled manner along the conducting wire 39 that connects the locations A, B, and C with one another.

As explained herein, a supporting device for a patient support panel can be inserted into the receptacle 33 of the transport device 10. The transport device can form a self-propelled and self-steering operating table 80 as shown, by way of example, in FIG. 6. Operating table 80 includes a transport unit 81 similar or identical to the transport device 10 explained herein with reference to FIGS. 1 to 5. The transport unit 81 carries a table column 82 of the operating table 80. The table column 82 is adapted in known manner to be height-adjustable and carries on the upper side thereof a patient support panel in the form of an adjustable operating table panel 84.

Figure 6:
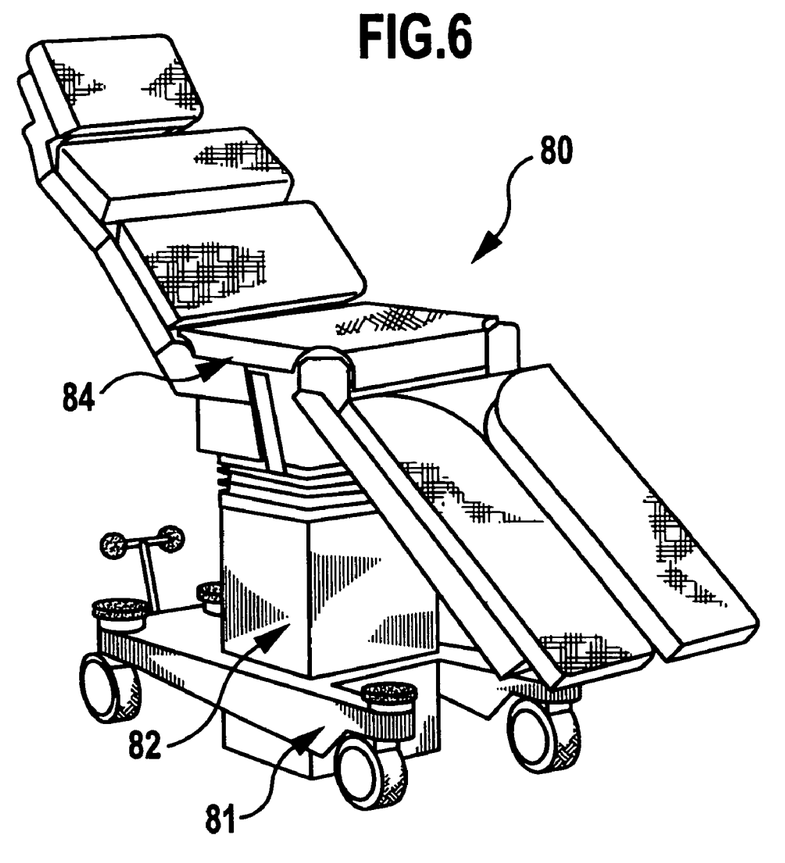
FIG. 6 is a perspective view representation of a transport device that includes a movable operating table panel.

The mobile operating table 80 can be moved in a sensor-controlled manner along a predetermined path line with programmable driving behavior by the transport unit 81. Travel of the operating table 80 takes place in a rail-free manner. The operating table 80 and the floor surface along which the operating table 80 is movable are thereby kept in a hygienic condition. Transportation of the operating table 10 is possible without putting strain on the patient. In particular, a patient can be transferred from an operating table to a diagnosing apparatus and back without the patient having to be moved from one bed to another. If one wishes to depart from a predetermined path line, it is merely necessary to deactivate the steering unit 50 of the transport unit 81 in a corresponding manner, as has been explained in detail herein with reference to the transport device 10.

Other Embodiments

It is to be understood that while the invention has been described in conjunction with the detailed description thereof, the foregoing description is intended to illustrate and not limit the scope of the invention, which is defined by the scope of the appended claims and claims that can be added based. Other aspects, advantages, and modifications are within the scope of the following and future claims.

What is claimed is:

1. A method of transporting a medical device, the method comprising:
   supporting the medical device on a transport device;
   moving the transport device along a predetermined path line, wherein the movement of the transport device is not guided by a rail;
   receiving a signal indicating the position of the transport device with respect to the predetermined path line while the transport device moves along the predetermined path line;
   adjusting the direction of the transport device in response to the signal;
   controlling a speed of the transport device to within a first predetermined allowable speed range along a first section of the path line; and
   controlling a speed of the transport device to within a second predetermined allowable speed range along a second section of the path line.

2. The method of claim 1, wherein the medical device is a patient support panel.

3. The method of claim 2, wherein the patient support panel is an operating table panel.

4. The method of claim 1, wherein the medical device is a medical appliance.

5. The method of claim 1, wherein the transport device is moved automatically along the predetermined path line.

6. The method of claim 1, further comprising:
   supplying current through an electrical conductor;
   detecting a magnetic or electromagnetic field generated by the current flowing through the electrical conductor; and
   adjusting the direction of the transport device automatically to move the transport device along the electrical conductor.

7. The method of claim 1, wherein the second section of the path line corresponds to an opposite direction from the first section of the path line.

8. The method of claim 1, further comprising:
   controlling an acceleration of the transport device to within at least one predetermined allowable accelerating range.

9. The method of claim 8, further comprising:
   controlling an acceleration of the transport device to within a first predetermined allowable acceleration range along a first section of the path line; and controlling a speed of the transport device to within a second predetermined allowable acceleration range along a second section of the path line.

10. The method of claim 9, wherein the second section of the path line corresponds to an opposite direction from the first section of the path line.

11. A transport device for transporting a patient support panel or a medical appliance, the transport device comprising:
- a drive unit, the drive unit comprising a drive motor;
- an undercarriage having wheels rotatably mounted thereon for driving the undercarriage, wherein one or more wheels are rotatably drivable by the drive unit and wherein one or more wheels are steerable;
- a sensor unit for receiving a signal indicating the position of the transport device with respect to a predetermined path line while the transport device moves along the predetermined path line; and
- a control unit, connected to the drive unit, configured to control movement of the transport device to within a first predetermined allowable speed range along a first section of the path line, and to control movement of the transport device to within a second predetermined allowable speed range along a second section of the path line.

12. The transport device of claim 11, wherein the transport device forms a self-propelled and self-steering operating table.

13. The transport device of claim 11, wherein the transport device is adapted to be steered either in response to a signal from the sensor unit or manually.

14. The transport device of claim 11, wherein the transport device comprises a drive wheel arranged in a height-adjustable manner on the undercarriage.

15. The transport device of claim 11, further comprising an operating element, associated with the control unit, for selecting at least one particular range of speeds to be associated with a desired path line.

16. The transport device of claim 15, further comprising a memory, associated with the control unit, for storing path line-dependent predetermined ranges of speeds.

17. The transport device of claim 16, wherein the path line-dependent predetermined ranges of speed are automatically stored in the memory during a learning run of the transport device.

18. The transport device of claim 16, further comprising an input element, associated with the control unit, for receiving input of at least one path line-dependent range of speeds.

19. The transport device of claim 11, said control unit being configured to control movement of the transport device to within at least one predetermined range of accelerations.

20. The transport device of claim 19, further comprising an operating element, associated with the control unit, for selecting at least one particular range of accelerations to be associated with a desired path line.

21. The transport device of claim 20, further comprising a memory, associated with the control unit, for storing path line-dependent predetermined ranges of accelerations.

22. The transport device of claim 21, wherein the path line-dependent predetermined ranges of accelerations are automatically stored in the memory during a learning run of the transport device.

23. The transport device of claim 21, further comprising an input element, associated with the control unit, for receiving input of at least one path line-dependent range of accelerations.

24. The transport device of claim 11, further comprising a steering unit coupled to the one or more steerable wheels and interacting with the sensor unit to steer the one or more steerable wheels to control movement of the transport device along the predetermined path line.

25. The transport device of claim 24, wherein the sensor unit is adapted for detecting a path marker disposed on the predetermined path line.

26. The transport device of claim 24, wherein the sensor unit is adapted for detecting a path marker extending along the predetermined path line.

27. The transport device of claim 24, wherein the sensor unit comprises a light-sensitive sensor.

28. The transport device of claim 24, wherein the sensor unit comprises an electronic camera.

29. The transport device of claim 24, wherein the sensor unit comprises a magnetic field-sensitive sensor.

30. The transport device of claim 24, wherein the sensor unit comprises a sensor that detects an electromagnetic field.

31. The transport device of claim 24, further comprising:
- a comparator for comparing an actual position detected by the sensor unit with a predetermined set position; and
- said control unit being connected to the steering unit, the sensor unit, and the comparator, wherein the control unit is adapted for supplying a steering signal to the steering unit upon deviation of the actual position from the set position.

* * * * *